(12) United States Patent
Botz et al.

(10) Patent No.: US 6,255,610 B1
(45) Date of Patent: Jul. 3, 2001

(54) SWITCH SYSTEM OPERATING BY THE MID TECHNIQUE

(75) Inventors: Jacob Botz, Ingersheim; Adam Weber, Bjetigheim-Bissingen, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/297,788

(22) PCT Filed: Oct. 7, 1997

(86) PCT No.: PCT/EP97/05496

§ 371 Date: Jul. 6, 1999

§ 102(e) Date: Jul. 6, 1999

(87) PCT Pub. No.: WO98/20508

PCT Pub. Date: May 14, 1998

(30) Foreign Application Priority Data

Nov. 7, 1996 (DE) ................................. 196 45 822

(51) Int. Cl.[7] ..................................................... H01H 9/00
(52) U.S. Cl. ........................... 200/315; 200/293; 200/333; 200/339
(58) Field of Search ..................................... 200/5 R, 6 R, 200/17 R, 18, 553, 556, 557, 293, 294–296, 308, 310, 313, 315, 329, 333, 339

(56) References Cited

U.S. PATENT DOCUMENTS

| 4,480,292 | * | 10/1984 | Schuder | 362/95 |
| 5,290,983 | | 3/1994 | Roberts et al. | 200/557 |
| 5,359,165 | * | 10/1994 | Leveque et al. | 200/317 |
| 5,770,825 | * | 6/1998 | Yamaguchi et al. | 200/5 R |
| 5,833,048 | * | 11/1998 | Dilly | 200/446 |
| 5,860,516 | * | 1/1999 | Geppert | 200/553 |
| 5,878,870 | * | 3/1999 | Ohtaki | 200/314 |

FOREIGN PATENT DOCUMENTS

| 39 17 637 | 5/1989 | (DE) | H01H/23/24 |
| 91 00 962 | 1/1992 | (DE) | H05K/7/14 |
| 92 12 962 | 9/1992 | (DE) | H01H/1/58 |
| 92 18 404 | 10/1992 | (DE) | H01H/3/02 |
| 43 03 980 | 2/1993 | (DE) | H01H/23/02 |
| 43 38 829 | 11/1993 | (DE) | H01H/3/02 |
| 44 26 350 | 7/1994 | (DE) | H01H/1/58 |
| 94 11 391 | 7/1994 | (DE) | H02G/3/08 |
| 42 42 100 | 12/1994 | (DE) | H01H/23/24 |
| 295 00 869 | 1/1995 | (DE) | B60R/16/02 |
| 195 14 653 | 4/1995 | (DE) | H01H/23/28 |
| 95 00963 | 1/1995 | (WO) | H01H/23/08 |

* cited by examiner

Primary Examiner—Michael Friedhofer
(74) Attorney, Agent, or Firm—J. Gordon Lewis

(57) ABSTRACT

A switch system wherein the housing consists of a spatially injection-molded conductor support (MID technique). The switch system is designed such that it can be largely adapted to the requirements of automotive technology. To that end, the top of the housing has a surface which can be equipped as desired with electrical and/or mechanical components and its underside has pin-like projections which are connected to strip conductor and act as plugs.

16 Claims, 5 Drawing Sheets

SWITCH SYSTEM OPERATING BY THE MID TECHNIQUE

BACKGROUND OF THE INVENTION

1. Field of the Invention

The invention pertains to a switch system operating by the MID technique. It concerns a three-dimensional injection-molded conductor support in which the wires are inserted directly into a three-dimensional housing.

2. Description of the Art

By this method, several layers of conductors can be encapsulated within the housing. It is also possible to encapsulate conductor track-like plastic structures in a housing which subsequently can be metal-plated and insulated. With this method, the conductor tracks run on the surface of the housing which extends in three directions in space (3D). Further details of said method are described in the magazine "Elektronik," Vol. 15, of Jul. 20, 1990 (pages 28–31). Further information is provided in an announcement by Forschungsvereinigung räumliche elektronische Baugruppen 3-D MID e.V. [Research organization for three-dimensional electronic components 3-D MID, registered]. The present invention deals with applying these techniques to a switch system, in particular, in the field of automotive engineering.

Because of the steadily growing number of electronic and electrical driving aids used in motor vehicles, the demand for switches has increased accordingly. Conventional switches essentially are comprised of a button, housing, contact system, mechanical detent, base plate, and cable connector. It is the object of the invention to simplify the design of this type of switch, while reducing its spatial dimensions.

SUMMARY OF THE INVENTION

A possible application of the MID technique to switches is described in DT-OS 44 26 350.3. The invention, therefore, starts out from a switch system. In principle, the present invention thus comprises the switch housing which is so designed that at one side it allows a simple automatic fitting of the switch housing with electronic and/or mechanical components, while making full use of the advantages offered by the MID technique. By this method, a switch system is created which can be flexibly equipped and, having been provided with conductor track supports, can be flexibly connected. This type of system offers special advantages in that the inventive housing offers extremely variable uses, as a result of which the large quantity essential for the MID technique can be achieved, in order to guarantee an efficient production of switches.

In addition, the inventive housing offers the option of operating by the MID technique insofar as, at the same time, the cable connector is developed as a molded plastic component in which the plastic projections serving as cable connectors are metal-plated.

Of course, it is also within the scope of the invention if, in special cases, electrical or mechanically-stressed parts are molded into the plastic housing. This, for example, can be achieved in that the plug section of the housing is provided with molded pins in order to guarantee a permanent contact even if it is necessary to plug in the plug several times, or otherwise, the conductor tracks forming the plug would be subjected to excessive electrical or mechanical stress.

Because the component surfaces are located at the upper side of the housing, while the switch section is arranged at the underside of the housing, the usual feed through connections will, as a rule, be necessary to provide a cable connection from the upper to the lower side of the housing.

This type of feed through connection also allows connection changes in the switch system in that some contact openings are designed to be conductive, while others have no conductive connections.

However, it is possible not only to modify the protective circuits in the housing, but also to form various switch types. Microswitches can be so selected that, when actuated, close or open a circuit or switch to a different circuit or, after having been actuated, execute several of these processes simultaneously. These various microswitch types may be installed simultaneously in multiple locations into the inventive housing and be combined among one another. In addition to a microswitch or instead of a microswitch, it is also possible to use an LED which in automotive engineering informs the driver either of the position of the switch (during darkness) or of the status of the switch (on or off).

Ultimately, the inventive housing can be so equipped that no microswitch is provided and that the housing performs indicator functions only by means of the LED.

It is also possible to actuate the microswitch manually or by mechanical operating devices directly, or to form the indicator surface directly by means of the surface of the inventive housing. In many cases, however, the electric circuit on the surface of the housing is protected or covered for aesthetic reasons. Thus, the housing is placed onto a cover which shields the protective circuits on the housing and prevents mechanical access. For example, by inserting lenses into the cover or by installing windows, which could be provided with symbols, the motor vehicle operator is provided with an aid.

A simple form of operating the microswitch fitted at the upper side of the housing can also be achieved. By this method, the cover serves as a button for the switches, in that the cover can be actuated manually or mechanically. By this method, it is necessary to take into consideration that the contact travel must meet various requirements. If, for example, the cover represents the button of a pushbutton, a comparatively small contact travel is adequate. This also applies if the circuit is to be activated only when the button is pressed. On the other hand, however, it may be desired that the position of the button also indicates the switching status of the switch. With a pushbutton, for example, this may be the down position of the pushbutton, or with a toggle switch it may be the tilt position of the switch. Therefore, this requires considerable contact travel for the motor vehicle operator to clearly identify the position of the button. In order to also meet this requirement with the inventive housing, an attachment is placed onto the housing, which, as a result of a corresponding seating of the cover, ensures an extended push or toggle path. The cover is preferably latched onto the housing. However, there are other options of attaching said cover, such as gluing, welding, or the like.

If the cover is to be tiltable with respect to the adapter and the housing, it is recommended that the point of rotation is placed as high as possible, so that the cover achieves the highest angle of rotation before it is stopped by the housing.

Within the scope of the invention, however, it is also possible that the cover itself be produced by applying the MID technique and thus acts as a movable contact element. Further, said cover can act both as a contact element in a pushbutton and as a toggling element in toggle switch. These switching functions may be selected in addition to actuating the microswitches located on the housing or instead of these microswitches.

In order to achieve a permanent switching status, and to fix the position of the cover corresponding to the switching position of the actuated switch, it is recommended to have the adapter and the cover form a latch configuration as an improvement of the invention. This offers the essential advantage that the latching configuration can simply be adapted by selecting the adapter and the cover for the selected switch. In connection with the button, the adapter ensures that the desired latching positions are provided at the same time. As a result, further means are provided to adapt the inventive housing to the changing requirements of switches.

A particularly simple latching option has a latching curve in the adapter and a detent cam, which both elastically interlock, formed of a stop bolt which is spring-loaded at the cover. At the same time, the latching positions are provided essentially by the adapter, so that by selecting a corresponding adapter it also is possible to obtain the desired latching positions, without having to replace the cover. By developing the cover with the MID technique with an injection-molded conductor support, the inventive switch system provides a number of additional advantages. For one thing, as mentioned above, the cover itself can serve as a contact element. In special cases, it is also possible to fit the cover with a metal-plated contact element, which, for example, can be molded in order to improve the switching quality of the cover. By inserting the conductor tracks into the cover, a lamp (for example, an LED) can be installed in the cover itself, so as to avoid the use of special light guides. By this method, it must be ensured that the lamp is supplied with power, which, for example, can be done via the latching device, or with a movable cover via the bearing enabling the movement. There is also the basic possibility of molding, at suitable locations, components in the housing (or the cover) which achieve the desired properties, so that improvements can be achieved in the mechanical or electrical field.

BRIEF DESCRIPTION OF THE DRAWING

The embodiments of the invention are explained in the following by means of the drawing. Shown are.

DESCRIPTION OF THE PREFERRED EMBODIMENTS

Figure 1:
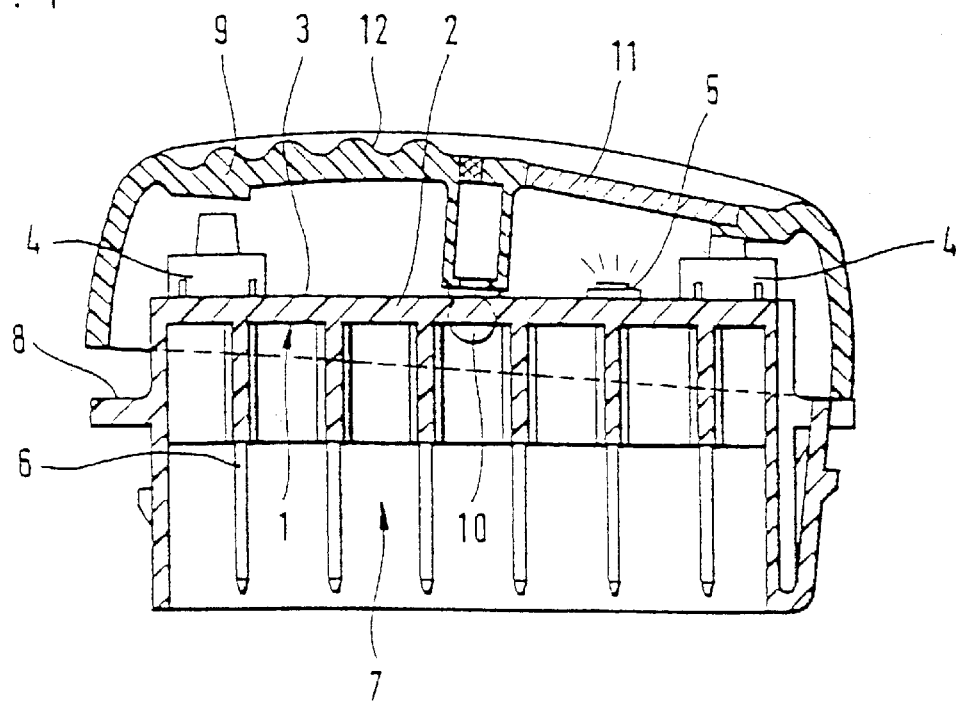
FIG. 1 is a first embodiment of the inventive housing with a tiltable cover.

FIG. 1 shows a housing 1 which is produced according to the MID technique. This means that within the molded housing, the conductor tracks and electrical connections are already embedded or brought out at the surface. The housing 1 is provided with at least one level component surface 3 on the housing interior or housing top surface 2 onto which components according to the SMD technique (Surface Mounted Device) can be mounted and soldered by means of automatic machines. In this case, microswitches 4 and an LED 5 are provided as components.

The housing 1 at its underside has molded projections 6, the surfaces of which are developed as electrically conductive conductor tracks, so that the projections 6 as a whole function as switches. Further provided at the housing 1 are stop ends 8 for-limiting the tilting motion of a cover 9, which is tiltable via pivot pins 10 of a pivot bearing (not shown in detail). A window 11 is installed in the cover 9 through which the light of the LED 5 is visible. On the top surface of the cover 9 there also is provided a gripping surface 12.

Figure 2:
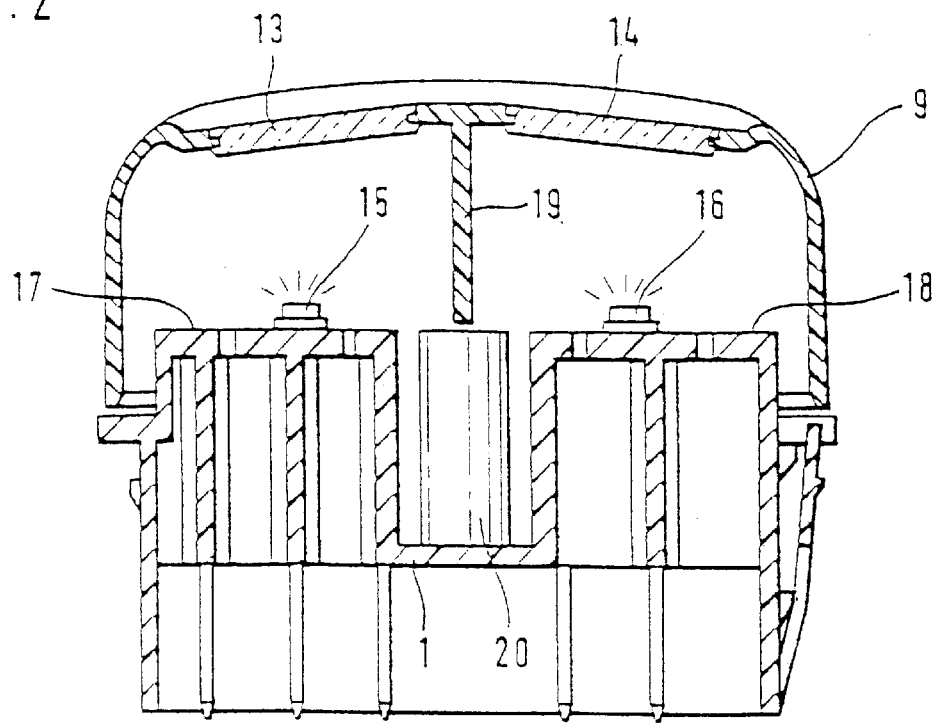
FIG. 2 is an elevated form of the housing with a solidly latched cover.

FIG. 2 shows a slightly modified design of the housing 1 in which the modifications serve to adapt the shape of the housing to the shape of commonly used switches. In terms of the invention, it is important that with the embodiment according to FIG. 2, the cover 9 is latched onto the housing 1 (also refer to FIG. 3), and thus is solidly mounted onto the housing 1. The housing also has two windows 13, 14 which, in an appropriate manner, can be inserted or even molded into the cover. Through these windows 13, 14 emerges the light of the LEDs 15, 16 which are placed onto the component surfaces 17, 18 according to the SMD technique. The component surfaces 17, 18 are elevated in order to use automatic machines for installation that are able to reach the flat component surfaces.

The cover 9 in FIG. 2 has a partition 19 which separates the light of the two LEDs 15, 16. It is also possible to arrange an additional diode in a socket 20 on the housing 1, in which, however, two partitions must be provided.

Figure 3:
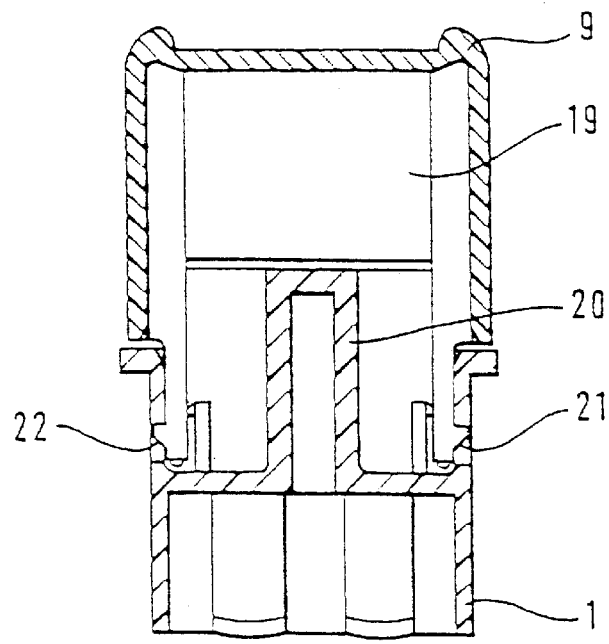
FIG. 3 is a front view of the housing according to FIG. 2.

FIG. 3 shows a partial section of a front view of the housing according to FIG. 2 which clearly indicates that the cover is attached to the housing 1 via latching devices 21, 22.

Figure 4:
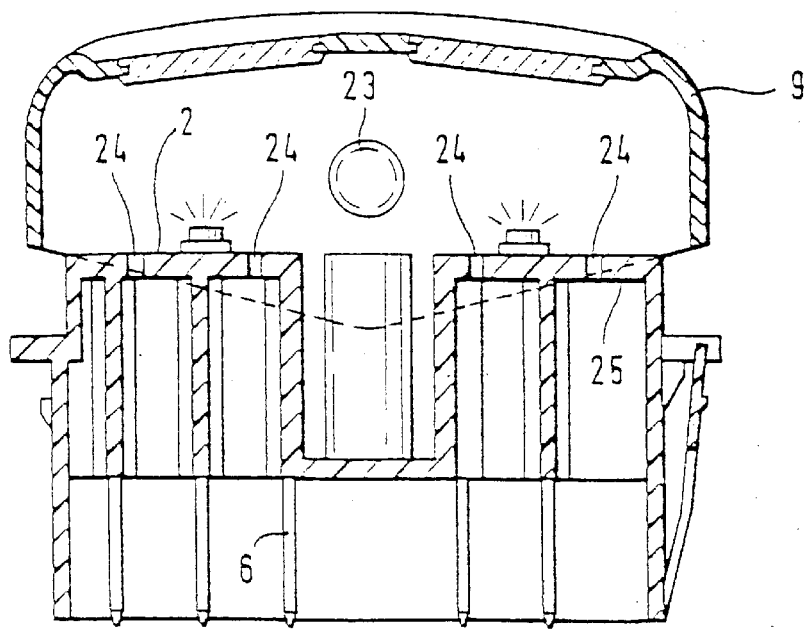
FIG. 4 shows the housing according to FIG. 2 with a tiltable cover.

In FIG. 4, the cover 9 according to FIG. 2 is tiltable at the housing via a pivot bearing 23. For this purpose, corresponding side walls can be constructed at the housing. However, an adapter according to FIG. 6 may also be used which subsequently will also be explained in greater detail. FIG. 4 also shows bore holes 24 for the purpose of the feed through connections, thus connecting the conductor tracks on the upper side of the housing 2 with the lower side of the housing 25. By this method, the connections for microswitch diodes and other electrical components can be connected with the projections 6 that function as switches 7.

Figure 5:
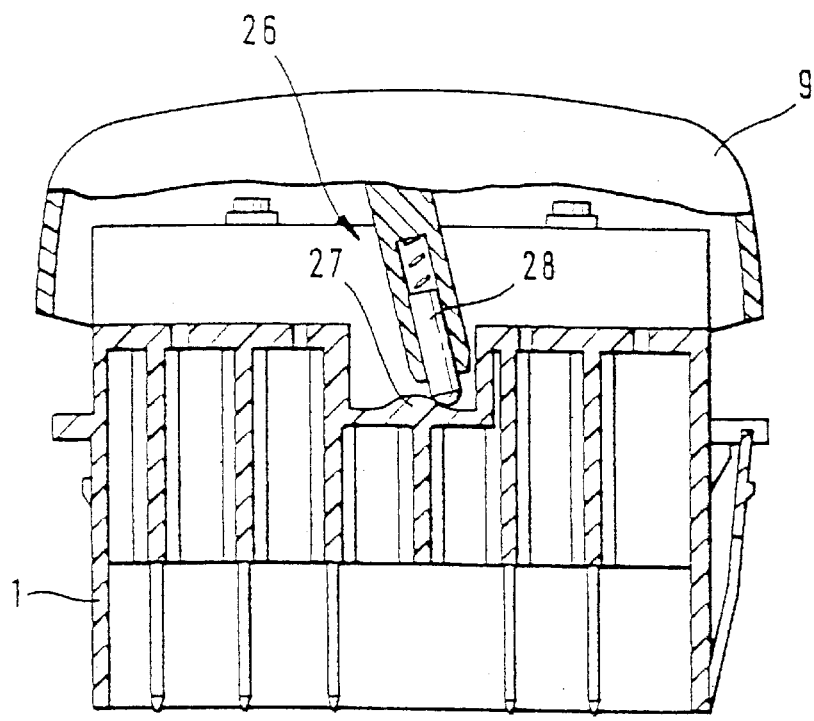
FIG. 5 shows the housing according to FIG. 4 with a latching configuration.

FIG. 5 shows the housing according to FIG. 4 in which a latching configuration is provided. Moreover, the housing 1 is provided with a latching curve 27 which acts upon a stop bolt 28 which is spring-loaded in the cover 9.

Figure 6:
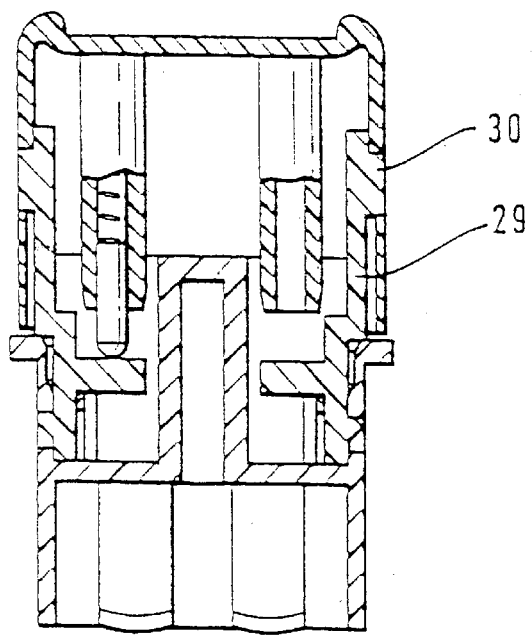
FIG. 6 is a sectional front view of the housing according to FIG. 4, with inserted adapter and a mounted tiltable cover.

FIG. 6 shows the housing according to FIG. 4 in which, however, an adapter 29 was used. The adapter 29 has the function of relocating the point of rotation of the cover 9 via the component surface 2. By this method, it is possible to keep the housing 1 relatively flat if, according to FIG. 2, said housing is needed purely as an indicator. With a number of component insertion machines, in particular, if a large number of adjacently configured housings are to be fitted simultaneously, it is not possible for the component insertion machine passing over the housing 1 to dip into lower-lying component surfaces. With respect to the housing 1, the component surfaces, therefore, should be located on the upper surface. In this case, however, it would not be possible to relocate the point of rotation of the cover 9 beyond the component surface without an adapter 29. However, to still achieve a wide contact travel for the cover 9, the components are fitted first, and then the adapter 29 with the cover 9 is placed onto the fitted housing 1. As is obvious from the comparison of FIGS. 3 and 6, the latching devices 21, 22 for the adapter 29 and the cover 9 are identical, so that instead of the cover 9 in FIG. 3, the adapter 29 can be inserted into the latching devices 21, 22.

Moreover, FIG. 6 shows a latching means corresponding to the latching means 26, 27 in the front view. Further, the latching curve can be arranged both at the housing 1 and the adapter 29 in which the second option preferably is used for the reasons stated above.

As is shown in FIG. 6, two latching means are prepared in the cover 9, so that by turning the cover 9, it is possible to achieve a deviating latching path.

Figure 7:
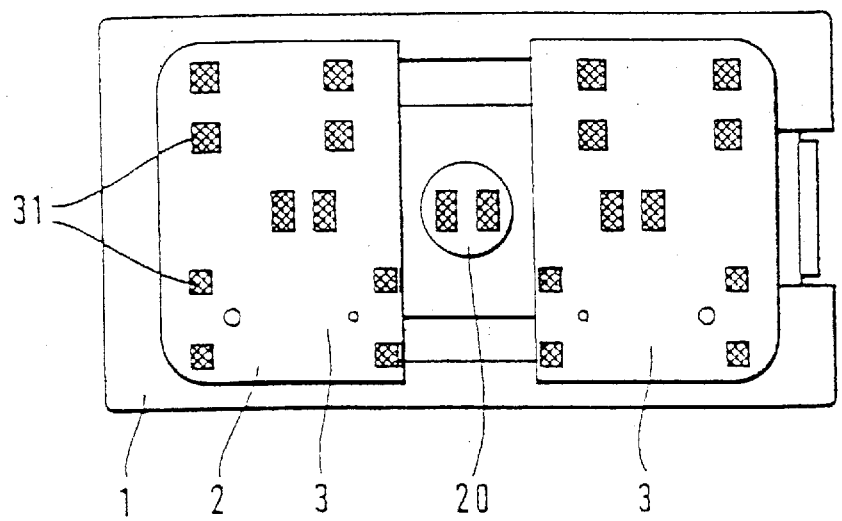
FIG. 7 shows a top view of the housing according to FIG. 2, with the arrangement of the prepared solder contacts.
Figure 8:
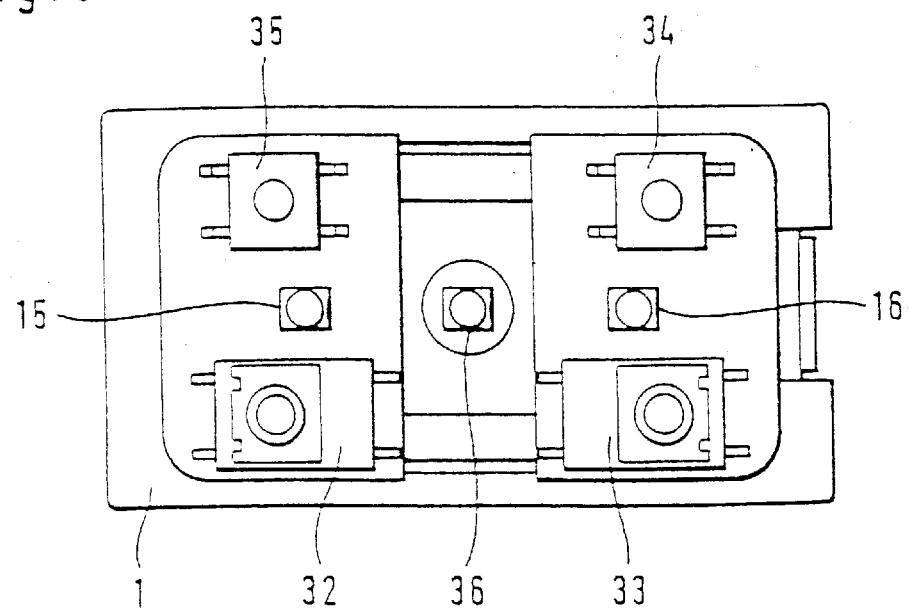
FIG. 8 is the view of the housing according to FIG. 7, provided with LEDs and microswitches.

FIG. 7 shows a top view of the housing 1 and especially the component surfaces 3 of the upper side of the housing 2. In this view, the prepared soldering points 3, which serve as connecting points for the electrical components, can be identified. These, for example, may be the microswitches 33 through 35, and/or the LEDs 15, 16, 36 (see FIG. 8). By this method, a combination is also possible in that the toggle switch is only provided with a central LED 36 located on the base, while the two LEDs 15, 16 are omitted. FIGS. 7 and 8 also show the option of configuring microswitches of varying class and shape on the component surface 3, so that these microswitches can be fitted randomly in any combination.

Figure 9:
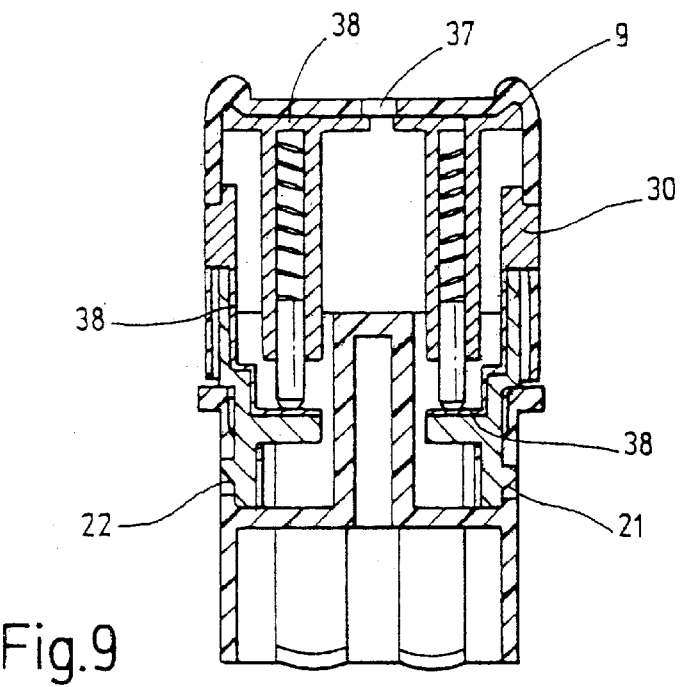
FIG. 9 is a sectional front view of the housing according to FIG. 6, also showing the formation of the cover as an injection molded conductor support, and a lamp inserted into the cover with power being supplied via the swivel bearing.
Figure 10:
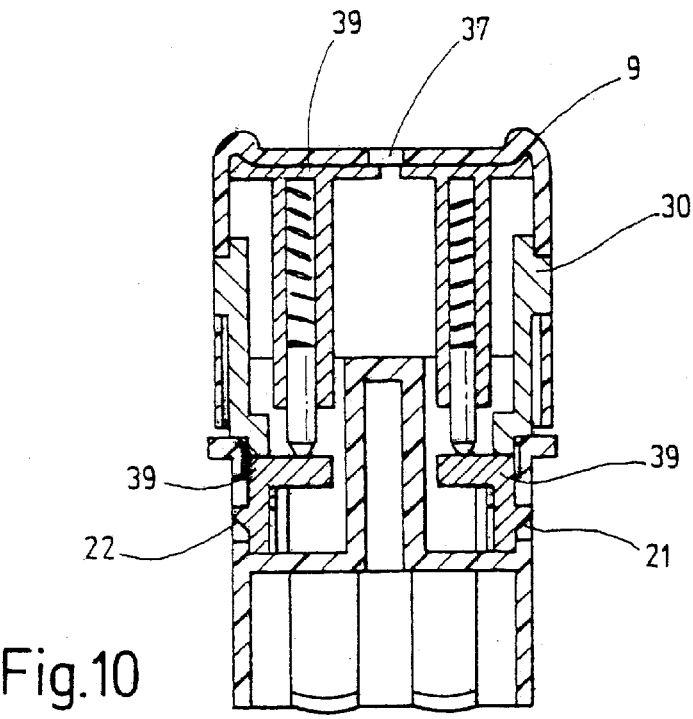
FIG. 10 is a sectional front view of the housing according to FIG. 6, also showing the formation of the cover as an injection molded conductor support, and a lamp inserted into the cover with power being supplied via the latch devices.

FIGS. 9 and 10 each show a sectional front view of the housing with an inserted adapter and a mounted tiltable cover. The cover 9 is shown as an injection molded conductor support, including a lamp 37 inserted into the cover. In FIG. 9, power is being supplied through conductive material 38 via the swivel bearing 30. In FIG. 10, power is being supplied through conductive material 39 via the latching devices 21, 22.

What is claimed is:

1. A switch system with a housing, which is designed as a three-dimensional injection-molded conductor support (MID), characterized in that on one of an inside of the housing and an upper side of the housing is provided at least one flat component surface onto which are placed at least one component of the group consisting of mechanical and electrical components, and that on an underside of the housing are provided solid molded housing projections, which are fitted with electrical contacts and which form a connector component for electrical cable connectors.

2. The switch system according to claim 1, characterized in that at least one component is formed by one of a microswitch and an LED.

3. The switch system according to claim 1, characterized in that above the upper side of the housing is arranged a cover that is provided with at least one transparent area, which upper side is provided with an LED visible through the transparent area of the cover.

4. The switch system according to claim 3, characterized in that the cover is movable with respect to the housing.

5. The switch system according to claim 1, characterized in that above the upper side of the housing is arranged a cover, which cover functions as an operating rocker of a toggle switch.

6. The switch system according to claim 1, characterized in that above the upper side of the housing is arranged a cover, which cover is provided with at least one transparent area and is arranged above the upper side of the housing, and that onto the component surface is placed an LED visible through the transparent area of the cover.

7. A switch system with a housing, which is designed as a three-dimensional injection-molded conductor support (MID), characterized in that the switch system has a cover, which cover is provided with at least one transparent area and is arranged above an upper side of the housing, and that on one of an inside of the housing and the upper side of the housing is provided at least one flat component surface onto which is placed an LED visible through the transparent area of the cover, and that on an underside of the housing are provided solid molded housing projections, which are fitted with electrical contacts and which form a connector component for electrical cable connectors, and that between the cover and the housing is inserted an adapter in which the adapter is latched with the housing.

8. The switch system according to claim 7, characterized in that the cover is pivoted in the adapter via a swivel bearing.

9. The switch system according to claim 7, characterized in that the adapter and the cover form a latch configuration formed by a latching curve and a detent cam, which elastically interlock.

10. The switch system according to claim 9, characterized in that the latching curve in the adapter and the detent cam are formed by a stop bolt which is spring-loaded at the cover.

11. A switch system with a housing, which is designed as a three-dimensional injection-molded conductor support (MID), characterized in that the switch system has a cover, which cover is provided with at least one transparent area and is arranged above an upper side of the housing, and that on one of an inside of the housing and the upper side of the housing is provided at least one flat component surface onto which is placed an LED visible through the transparent area of the cover, and that on an underside of the housing are provided solid molded housing projections, which are fitted with electrical contacts and which form a connector component for electrical cable connectors, and that the housing and the cover form a latch configuration formed by a latching curve and a detent cam, which elastically interlock.

12. The switch system according to claim 11, characterized in that the latching curve in the housing and the detent cam are formed by a stop bolt which is spring-loaded at the cover.

13. A switch system with a housing, which is designed as a three-dimensional injection-molded conductor support (MID), characterized in that the switch system has a cover, which cover is provided with at least one transparent area and is arranged above an upper side of the housing and is provided with an injection-molded conductor support (MID), and that on one of an inside of the housing and the upper side of the housing is provided at least one flat component surface onto which is placed at least one component of the group consisting of mechanical and electrical components, and that on an underside of the housing are provided solid molded housing projections, which are fitted with electrical contacts and which form a connector component for electrical cable connectors.

14. The switch system according to claim 13, characterized in that between the cover and the housing is inserted an adapter in which the adapter is latched with the housing via at least one latching device and that the adapter and the cover form a latch configuration formed by a latching curve and a detent cam, which elastically interlock and that into the cover is inserted a lamp which is visible from an outside of the cover, and that a power supply is provided via at least one latching device.

15. The switch system according to claim 14, characterized in that the latching curve in the adapter and the detent cam are formed by a stop bolt which is spring-loaded at the cover.

16. The switch system according to claim 13, characterized in that between the cover and the housing is inserted an adapter in which the adapter is latched with the housing via at least one latching device and that the cover is pivoted in the adapter via a swivel bearing and into the cover is inserted a lamp which is visible from an outside of the cover, and that a power supply is provided via one of at least one latching device and the swivel bearing of the cover.

* * * * *